July 9, 1940.  P. F. HAWLEY  2,206,890
ELECTRICAL LOGGING OF WELLS
Filed May 27, 1938  2 Sheets-Sheet 1

INVENTOR
Paul F. Hawley
BY
Geo. L. Parkhurst
ATTORNEY

July 9, 1940.   P. F. HAWLEY   2,206,890
ELECTRICAL LOGGING OF WELLS
Filed May 27, 1938   2 Sheets-Sheet 2

INVENTOR
Paul F. Hawley
BY
ATTORNEY

Patented July 9, 1940

2,206,890

UNITED STATES PATENT OFFICE 2,206,890

ELECTRICAL LOGGING OF WELLS

Paul F. Hawley, Tulsa, Okla., assignor to Stanolind Oil and Gas Company, Tulsa, Okla., a corporation of Delaware Application May 27, 1938, Serial No. 210,459

10 Claims. (Cl. 175—182)

This invention relates to the electrical logging of wells and more particularly to a well logging method and apparatus in which a current flows through a circuit including two electrodes located near the surface of the ground, one close to and one distant from the well, and the induced potential within various portions of the well is measured by means of a circuit including two vertically spaced electrodes within the well.

A number of different methods for electrically logging wells are known. These methods are highly useful as a means of correlating the subsurface strata traversed by wells in a common area, thereby obtaining valuable information concerning the sub-surface geology.

It is an object of my invention to provide a new method and apparatus for this purpose. Another object is to provide well logging methods and apparatus which can be applied quickly and expeditiously and which yield correlatable logs. A further object of my invention is to provide methods and apparatus for well logging in which a minimum number of electrodes and electrical conductors are used within the well. A still further object of my invention is to provide a method and apparatus particularly suited to the rapid logging of shallow wells. Other and more detailed objects, uses and advantages of my invention will become apparent as the description thereof proceeds.

The invention will now be described with reference to the accompanying drawings which form a part of this specification and are to be read in conjunction therewith. In the drawings.

In practicing my invention a current which may be from about 0.01 to about 100 amperes, for instance about 5 amperes, is passed between electrodes 11 and 12, both of which are located close to the surface of the earth—one of them relatively distant from bore hole 13 (which is preferably filed with aqueous fluid) and the other relatively close to bore hole 13. I find that good sensitivity is obtained by having the nearer current electrode 12 located in the immediate vicinity of the bore hole, for instance within 20 feet of it and the other or far electrode located at a distance about ten times the maximum depth of the survey to be conducted in bore hole 13. When this spacing is used it becomes unnecessary to determine with accuracy the distance from electrode 11 to bore hole 13 so long as the distance is known in all cases to be in excess of approximately ten times the maximum depth of the survey to be made. However, electrode 11 can be closer than this to bore hole 13, for instance a distance equal to the maximum depth of the survey, but in this event in order to obtain correlatable logs this distance must be kept constant for all wells surveyed or appropriate corrections must be made. Similarly in the case of electrode 12, its distance from bore hole 13 must be kept reasonably constant or appropriate corrections must be made.

Figure 1:
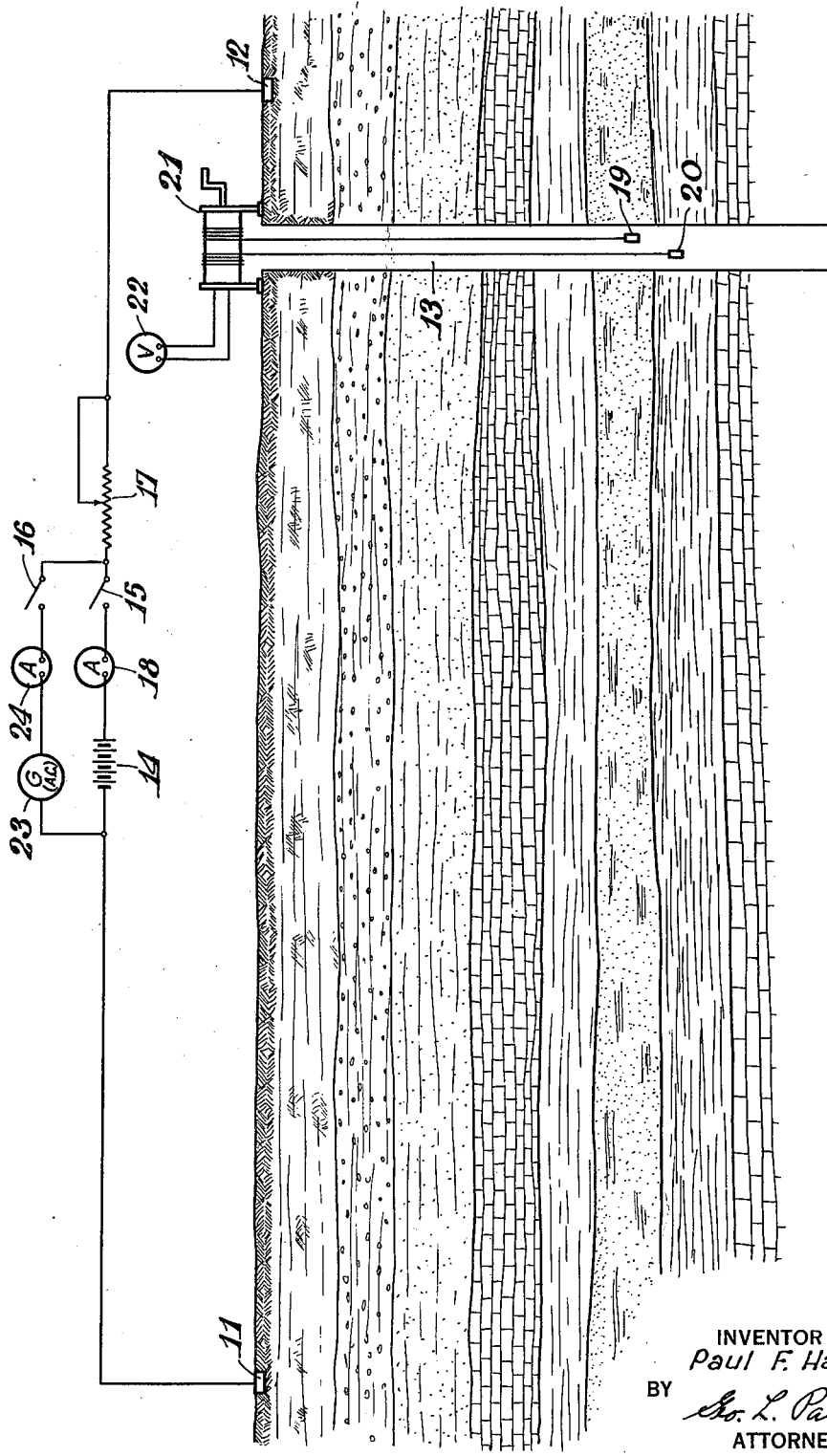
Figure 1 is a diagrammatic and highly idealized section of a portion of the earth's crust showing one specific embodiment of apparatus in accordance with my invention.
Figure 2:
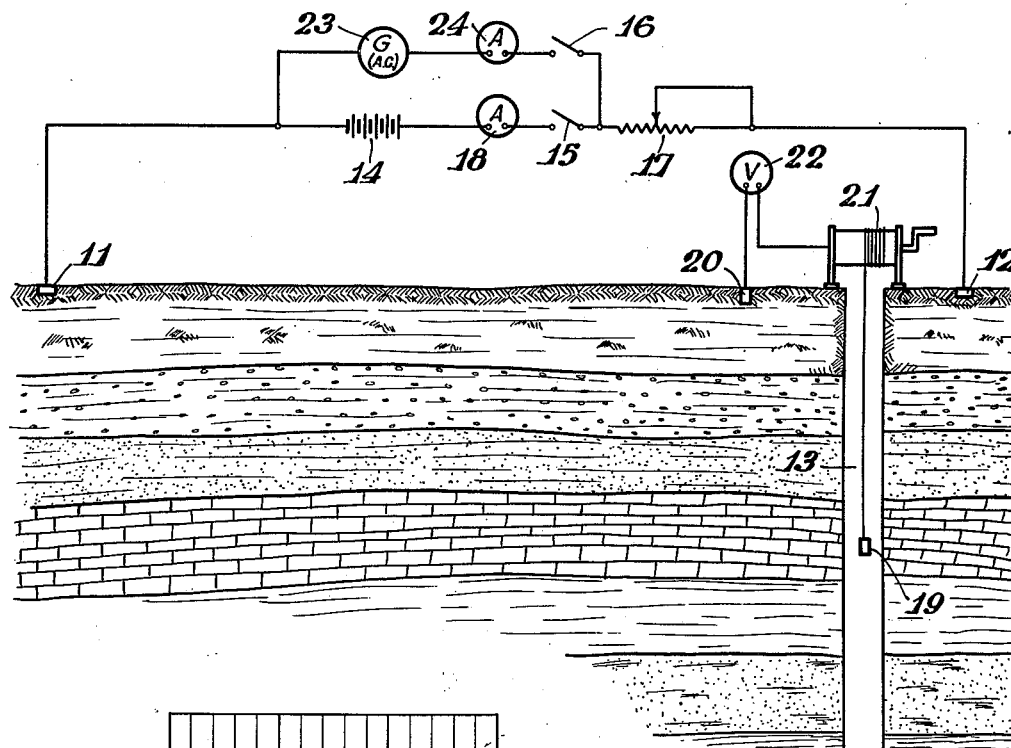
Figure 2 is similar and illustrates another specific embodiment of my invention.

In any event electrode 11 should preferably be at least twice as far from bore hole 13 as is electrode 12. It is also preferred in most cases that electrodes 11 and 12 be located on opposite sides of bore hole 13 as shown in Figures 1 and 2 but this is not essential to the successful application of my invention to the logging of wells.

Current is passed through the circuit including these two electrodes by means of battery 14, switch 15 being closed and switch 16 being open. This current is kept constant by means of variable resistance 17 and ammeter 18. The current flowing within the earth between the two current electrodes 11 and 12 sets up potential differences between vertically spaced points within the well and these potential differences are measured by means of potential electrodes 19 and 20 which can be of metal or more suitably be of the porous pot type.

These potential electrodes are vertically spaced from each other by a distance which can suitably be from about 1 foot to about 20 feet. Close spacing permits the measurement of thin geological strata but relatively large spacings give large potential differences and the readings are therefore more reliable.

Potential electrodes 19 and 20 are raised and lowered together by means of hoist 21 and readings are taken on voltmeter 22 for various positions. This voltmeter is, of course, connected with electrodes 19 and 20 by the conductors shown and suitable slip rings and contactors associated with hoist 21. From the voltmeter readings and the known depth of the electrodes a log of potential against depth can be made or a log of resistance against depth can be prepared as will hereinafter appear.

While it is occasionally advantageous to use direct current in the circuit including electrodes 11 and 12, I prefer to use alternating current which can be accomplished by opening switch 15 and closing switch 16, thereby throwing A. C. generator 23 into the circuit and battery 14 out of the circuit. An A. C. ammeter 24 is, of course, used with generator 23.

When using D. C. I have found that voltmeter 22 can suitably be a D. C. vacuum tube voltmeter reading to 20 millivolts full scale. This is normally adequate for survey depths of about 500 feet. A potentiometer can also be used very satisfactorily although the operation of this instrument takes a little more time. When using A. C. a suitable sensitive voltmeter 22 will, of course, be selected. It will also be apparent that a recording voltmeter can be used and that a direct log of potential against depth can be prepared.

An especially advantageous point of this method can be seen from the fact that no current electrode with a coresponding lead is present in the well. As a result, there is no chance for pickup from the current lead to the voltage leads, either by leaky insulation in the well cable, poor insulation in the spacers used between electrodes, or in the case where alternating current is used, by induction. This last becomes of importance when large currents are used for increased sensitivity.

Instead of using two potential electrodes 19 and 20 within the well, one electrode 19 can be located within the well and the other electrode 20 can be grounded, preferably near the top of the well as shown in Figure 2 which corresponds otherwise to Figure 1.

From the positions of the various electrodes, the voltmeter and ammeter readings, the known resistances of the cables involved in the voltmeter circuit, and the contact potentials of the electrodes, the resistance of the formation in question can be determined by methods which will be apparent to those skilled in the art but this is not necessary since, when electrode spacings and the applied current are kept constant for the various wells which are to be correlated, correlatable data can be obtained by plotting potential directly against depth.

Figure 3:
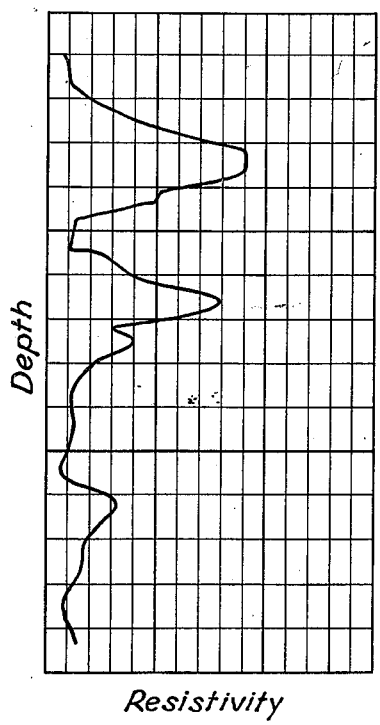
Figure 3 is a typical log obtained by the use of the apparatus depicted in Figure 1.

A typical log of resistivity against depth is shown in Figure 3.

The method of my invention is less applicable to very deep wells than to shallow wells, but can be used highly successfully and more advantageously than prior methods at depths as great as 500 or 1000 feet. Electrical logging operations in shallow wells are becoming highly important since by determining the contours of a shallow tectonic formation located below the weathered layer, a contour map can be obtained which is usually indicative of the contours of the deeper formations. Also, the course of surface faults can be easily mapped. My method thus constitutes a method of geophysical prospecting which is highly advantageous. Moreover, there is some evidence to indicate that electrical anomalies at depths less than 1000 feet are often indicative of deep-seated petroleum deposits.

While I have described my invention in connection with certain specific embodiments thereof, it is to be understood that these are by way of example and not by way of limitation and my invention is not to be restricted thereto but only to the scope of the appended claims which should be construed as broadly as the prior art will permit.

I claim:

1. A method of electrical logging comprising applying current to the ground at two points, one located near the surface of the earth close to a bore hole and the other near the surface of the earth at least twice as far from said bore hole, and measuring the potentials set up at various depths within said bore hole.

2. A method of electrical logging comprising applying current to the ground at two points near the surface of the earth, one of said points being located at least twice as far from a bore hole as the other and at a distance from the top of said bore hole at least equal to the maximum depth to which said bore is to be logged, and measuring the potentials set up at various depths within said bore hole.

3. A method of electrical logging comprising applying current to the ground at two points, one located near the surface of the earth in the immediate vicinity of the top of said bore hole and the other near the surface of the earth at a distance from the top of said bore hole at least about ten times the maximum depth to which said bore hole is to be logged, and measuring the potentials set up at various depths within said bore hole.

4. A method of electrical logging comprising applying current to the ground at two points, one located near the surface of the earth close to a bore hole and the other near the surface of the earth at least twice as far from said bore hole, and measuring the potentials set up between vertically spaced points within said bore hole.

5. A method of electrical logging comprising applying current to the ground at two points, one located near the surface of the earth close to a bore hole and the other near the surface of the earth at least twice as far from said bore hole, and measuring the potentials set up between points within said bore hole vertically spaced from each other by from about one foot to about 20 feet.

6. A method of electrical logging comprising applying current to the ground at two points, one located near the surface of the earth close to a bore hole and the other near the surface of the earth at least twice as far from said bore hole, and measuring the potentials set up between a point in said bore hole and a grounded point.

7. A method of electrical logging comprising applying current to the ground at two points, one located near the surface of the earth close to a bore hole and the other near the surface of the earth at least twice as far from said bore hole, and measuring the potentials set up between a point in said bore hole and a grounded point located near the top of said bore hole.

8. A method of electrical logging comprising applying current to the ground at two points near the surface of the earth on opposite sides of a bore hole, one of said points being in the immediate vicinity of said bore hole and the other being at a distance from the top of said bore hole at least equal to the maximum depth to which said bore hole is to be logged and measuring the potentials set up at various depths within said bore hole.

9. A method of electrical logging comprising applying current to the ground at two points near the surface of the earth on opposite sides of a bore hole, one of said points being at least twice as far from said bore hole as the other, and measuring the potentials set up at various depths within said bore hole.

10. Apparatus for electrically logging a well comprising means for applying an electric current to two grounded electrodes located near the surface of the earth, one of said electrodes being located relatively close to said well and the other at least twice as far from said well, and means for measuring the resultant potential set up at various depths within said well.

PAUL F. HAWLEY.